W. H. DAVIS.
LAMPBLACK MACHINE.
APPLICATION FILED OCT. 10, 1914.
1,191,673.
Patented July 18, 1916.
2 SHEETS—SHEET 1.
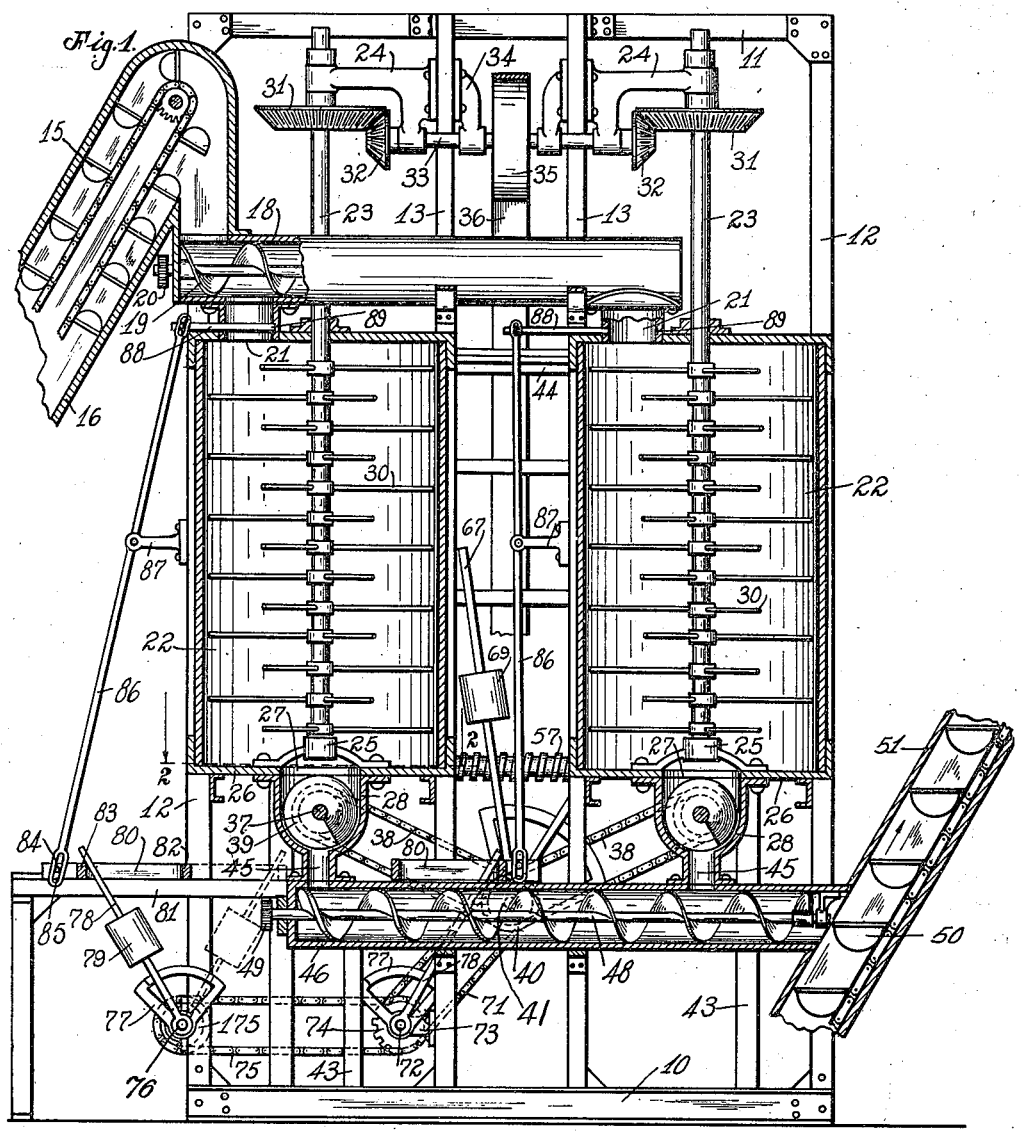
WITNESSES:
A. H. Edgerton
R. J. Lockwood
INVENTOR
William H. Davis.
BY
V. H. Lockwood
ATTORNEY W. H. DAVIS.
LAMPBLACK MACHINE.
APPLICATION FILED OCT. 10, 1914.
1,191,673.
Patented July 18, 1916.
2 SHEETS—SHEET 2.
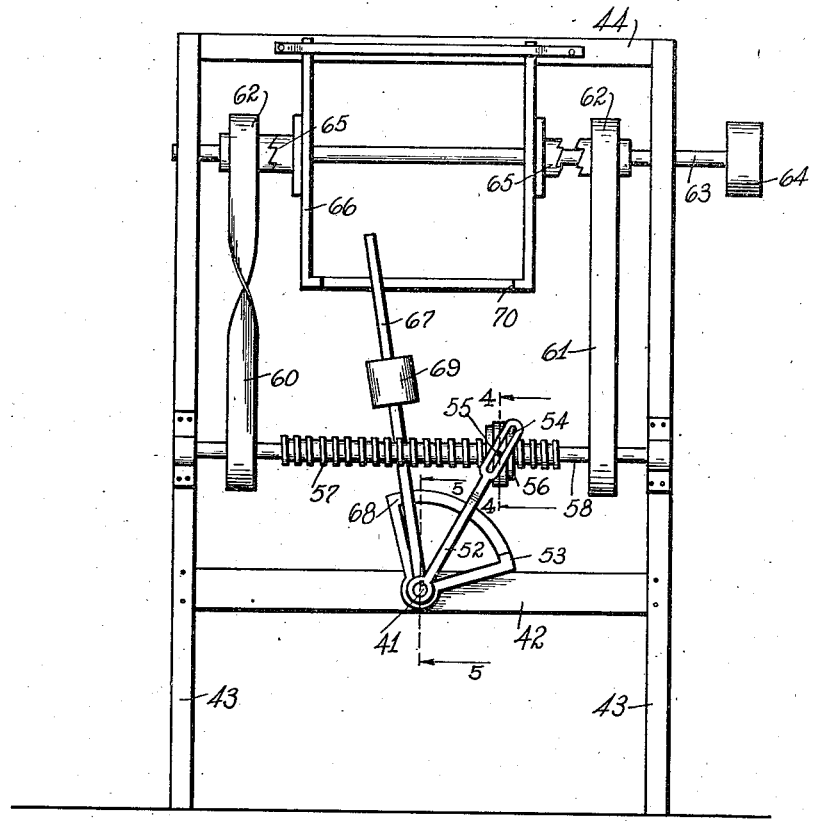
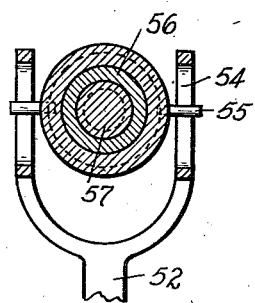
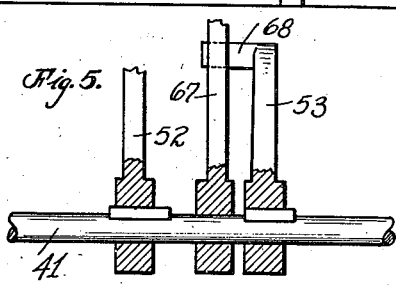
WITNESSES:
A. H. Edgerton
R. J. Lockwood
INVENTOR
William H. Davis
BY
V. H. Lockwood
ATTORNEY

UNITED STATES PATENT OFFICE.

WILLIAM H. DAVIS, OF MUNCIE, INDIANA.

LAMPBLACK-MACHINE.

1,191,673. Specification of Letters Patent. Patented July 18, 1916.

Application filed October 10, 1914. Serial No. 866,101.

*To all whom it may concern:*

Be it known that I, WILLIAM H. DAVIS, a citizen of the United States, and a resident of Muncie, county of Delaware, and State of Indiana, have invented a certain new and useful Lampblack-Machine; and I do hereby declare that the following is a full, clear, and exact description thereof, reference being had to the accompanying drawings, in which like letters refer to like parts.

The object of this invention is to improve the quality and physical characteristics of lamp black or carbon black. The process for accomplishing this object includes the agitating or beating of the flakes of carbon black after they have been formed so as to separate them and remove the air and gas therefrom. The chief feature in the operation of the mechanism for accomplishing this object is the mechanical agitation of the carbon black. Lamp black or carbon black is very light before it is worked and this agitation removes the air and gas therefrom and makes it of an even weight and more uniform in mixing with oil, varnish, etc. Such agitation before the carbon black is bolted, facilitates the bolting or sifting thereof and it will not cake which is one of the great difficulties in making and handling carbon black, for the caking interferes with the mixing thereof with oil, varnish, etc., and prevents uniform mixing. Carbon black treated as herein set forth does not float as readily on the oil whereas when caked it will float on the oil and is hard to mix therewith.

One feature of the machine for beating and treating the carbon black as above indicated, is the provision of a plurality of agitators supplied by single means from a common source and provision of mechanical means for automatically shifting the supply of carbon black from one beater to the other so that while one beater is operating, the other is being filled.

The full nature of the invention and details of the process will be understood from the accompanying drawings and the following description and claims.

In the drawings, Figure 1 is a vertical section through the apparatus with parts broken away. Fig. 2 is a section on the line 2—2 of Fig. 1. Fig. 3 is a vertical section through a portion of the machine to the rear of the section shown in Fig. 1, to illustrate the timing apparatus. Fig. 4 is a section on the line 4—4 of Fig. 3. Fig. 5 is a section on the line 5—5 of Fig. 3.

There is shown in Fig. 1 a vertical section through the machine at a point centrally through the beaters and there appears a frame having bottom bars 10, top bars 11 and uprights 12 on the sides thereof, and uprights 13 intermediate the uprights 12.

The carbon black comes from some suitable source of supply, preferably the receptacle of the carbon black making machine so that the carbon black can be treated by this machine as soon as it is made. The carbon black is elevated by a conveyer 15 in a casing 16 and discharged into a horizontal tubular conveyer chamber 18 in which a screw conveyer 19 operates, power being applied from some suitable source in a gear 20 on the shaft of the conveyer 19. This conveyer chamber 18 is mounted on one of the uprights 12 and both of the uprights 13, as shown in Fig. 1, and has near each end a downward outlet 21 in two corresponding agitating chambers 22. In each agitating chamber there is a vertical shaft 23 mounted at the upper end in a bearing arm 24 secured to one of the uprights 13 and at the lower end in a bearing 25 secured on the bottom 26 of the agitating chamber 22. The bearing frame is a skeleton frame so as to leave open a discharge outlet 27 from the agitating chamber into another horizontal conveyer chamber 28 below said agitating chamber. Each agitating shaft 23 has a number of agitating arms 30 extending radially therefrom and located in the agitating chamber so that as they revolve they will agitate the contents of the chamber. The shaft 23 is driven by a bevel gear 31 thereon and a bevel pinion 32 on a horizontal shaft 33 mounted in bearings 34. Both agitator shafts are geared in the same manner and the shaft 33 is driven by a pulley 35 thereon and belt 36 from a suitable motor.

On a screw conveyer 37 there is a clutch 39 of any desired construction, the details of which are not here shown, which is actuated by a belt 38 on a pulley 40 on a shaft 41 mounted in a cross bar 42 on an additional rear frame having uprights 43 and top bar 44, as seen in Fig. 3. The construction with reference to both conveyers 37 is similar and thereby said conveyers are alternately thrown into and out of operation. When either is operated, it discharges the lamp black or carbon black which has been agitated and stirred from the conveyer chamber 28 through an outlet 45 to another horizontal conveyer chamber 46 mounted on the two uprights 13 and one of the uprights 12. The conveyer chamber 46 receives the carbon black from both the chambers 22 alternately. There is a conveyer 48 in the chamber 46 which is driven from some power operating on a gear 49 and the carbon black is discharged into an elevating conveyer 50 operating in a chamber 51, the ends of which and the means for operating which are not shown.

The timing mechanism appears in Figs. 1 and 3 and includes the shaft 41 heretofore described. Said shaft 41 has an arm 52 secured to it operating in connection with a quadrant 53. The outer end of the arm 52 is bifurcated, as shown in Fig. 4, so as to provide two arms with slots 54 in which pins 55 extend from a traveling member 56 which is internally threaded and fits on a screw 57 secured on a horizontal shaft 58 mounted in the uprights 43. Said shaft has a pulley, not shown, near each end of which the belts 60 and 61 are mounted and said belts run over pulleys 62 on a shaft 63 driven by pulleys 64. The pulleys 62 have clutch faces adapted to engage a clutch member 65 secured to a shifting frame 66 slidably mounted on the shaft 63. Said frame 66 is shifted by a bar 67 which is loosely mounted on the shaft 41, as seen in Fig. 5, and it is actuated by arms 68 at the ends of the quadrant 53. A weight 69 is mounted on said bar 67 and there are stops 70 on the clutch frames 66 adapted to be engaged by the rear end of said bar 67 as it rocks first from one side and then to the other of the vertical plane through its axis, and thereby the clutches 65 are thrown into or out of operation with the pulley 62. Therefore, as the screw 57 operates, it will oscillate the quadrant 53 and cause it to throw the bar 67 first to one side and then to the other of the vertical plane through its axis for operating said clutch construction.

On the shaft 41 of the timing mechanism there is a wheel, not shown, carrying a sprocket chain 71 which operates on a sprocket wheel, not shown, which is secured on a rocker shaft 72 mounted in a bracket 73 on one of the uprights 13. On said shaft 72 there is a sprocket wheel 74 carrying a sprocket chain 75 which drives a sprocket wheel 175 on the shaft 76 mounted on the left-hand upright 12. Each of the shafts 72 and 76 carries a quadrant 77 similar to the quadrant 53 and each quadrant actuates a bar 78 similar to the bar 67 and each has a weight 79 thereon. Each of the bars 78 operates through a slotted frame 80 which is slidably mounted on a frame bar 81. Said frame 80 has stops 82 and 83 at the ends thereof and a pin 84 in each frame bar extends loosely into a slot 85 on a lever 86 fulcrumed between its ends to a bracket 87 and the upper ends of said bars 86 are operably connected to horizontal sliding bars 88 on slide valves 89 which close and open the outlets 21 from the conveyer chamber 18. The two frames 80 are so arranged with reference to the other mechanism just described that they will be rocked simultaneously and in opposite directions so as to open one of said valves or closets and close the other.

The operation is as follows:

The timing screw 57 may be driven at any desired speed so as to allow the predetermined time for one of the agitating chambers to become filled and the carbon black in the other chamber to be properly treated. This period of time should preferably be about three hours. Assuming the timing mechanism to be adjusted to suit the desired length of time, the carbon black passes up on the conveyer 15 into the conveyer chamber 18 and thence is conveyed by the screw conveyer 19 to the right-hand outlet 21, as the machine is shown in Fig. 1. This continues for the predetermined period, say three hours, but during that time the agitator in said chamber is operating as both agitators operate all of the time in the machine here shown, although that is not necessary. And while the right-hand chamber 22 is filling, the conveyer 37 below it is not operative. When the period of time predetermined has elapsed and the bar 67 has been thrown by the quadrant 53 from its left-hand position in Fig. 3 to the right-hand limit, it will force the clutch frame 66 to the right and thus disengage the left-hand pulley 62 and engage the right-hand pulley 62 to start the screw 57 running in the opposite direction. When that happens, however, the right-hand chain 38 in Fig. 1 and the right-hand conveyer 37 will be started in operation and also the two rock bars 78 will be operated so as to close the right-hand outlet 21 from the conveyer chamber 18 and open the left-hand outlet. During the next period of time, say three hours, the carbon black in the right-hand chamber will be constantly agitated and will be gradually fed out by the conveyer 37 through opening 45 into the conveyer casing below until said right-hand chamber 22 is empty and during this period of time, the left-hand chamber 22 is filled with carbon black and when such period of time again expires, the mechanism will be reversed so that the machine is continuously operative and one agitating chamber empties while the other fills and the carbon black is agitated during the entire filling and emptying steps of the process.

The invention claimed is:

1. A machine for making carbon black including a vertical agitating chamber for receiving the carbon black, means for supplying carbon black to the upper end thereof, means for removing the carbon black from the lower end thereof, and a rotary beater mechanism located within said chamber.

2. A machine for making carbon black including an agitating chamber, means for conveying previously formed carbon black to one end of said chamber, means for removing the carbon black from the other end of the chamber, and rotary beating mechanism within said chamber.

3. A machine for making carbon black including a beating chamber, means for intermittently charging said chamber with previously formed flakes of carbon black, and means within said chamber for beating said carbon black.

4. A machine for making carbon black including a beating chamber, means for charging said chamber with previously formed flakes of carbon black, means for removing the carbon black from said chamber and the said charging and removing means being arranged so as to be alternately operated, and means within said chamber for beating said carbon black.

5. A machine for making carbon black including a vertically disposed agitating chamber, an inlet opening at the upper end for previously formed carbon flakes, a valve for closing said opening, a conveyer for moving the carbon black from the lower end of said chamber, means for alternately opening said inlet valve and operating said carbon black removing means, and means within said chamber for agitating the carbon black while therein.

6. A machine for making carbon black including a plurality of agitating chambers, a valve for controlling the introduction of previously formed carbon flakes to each chamber, means for opening one of said valves and simultaneously closing the other valve, and means within each of said chambers for agitating the carbon black therein.

7. A machine for making carbon black including a plurality of agitating chambers, a valve for controlling the introduction of previously formed carbon flakes to each chamber, means for opening one of said valves and simultaneously closing the other valve, means for conveying the carbon black to the outer end of each of said chambers, means for alternately operating said conveying means, and an agitator operating in each of said chambers.

8. A machine for making carbon black including a plurality of vertically disposed agitating chambers with an inlet to the upper end of each chamber, a conveyer for removing the contents from the lower end of each chamber, an agitator in each chamber, a valve for controlling the inlet of carbon black to each chamber, and means for operating said valves and conveyer arranged so that said valves will be alternately opened and closed, said valves will be alternately operated and the conveyer for each chamber operated only when the valve controlling the admission of carbon black to said chamber is closed.

In witness whereof, I have hereunto affixed my signature in the presence of the witnesses herein named.

WILLIAM H. DAVIS.

Witnesses:
GEORGE W. CROMER,
HARRY LONG.